US012117416B2

(12) United States Patent
Mariani

(10) Patent No.: US 12,117,416 B2
(45) Date of Patent: Oct. 15, 2024

(54) SIGNAL PROCESSING

(71) Applicant: Guided Ultrasonics Ltd, Brentford (GB)

(72) Inventor: Stefano Mariani, Brentford (GB)

(73) Assignee: Guided Ultrasonics Ltd, London (GB)

( * ) Notice: Subject to any disclaimer, the term of this patent is extended or adjusted under 35 U.S.C. 154(b) by 701 days.

(21) Appl. No.: 17/274,740

(22) PCT Filed: Jun. 19, 2019

(86) PCT No.: PCT/GB2019/051717
§ 371 (c)(1),
(2) Date: Mar. 9, 2021

(87) PCT Pub. No.: WO2020/058663
PCT Pub. Date: Mar. 26, 2020

(65) Prior Publication Data
US 2022/0050082 A1 Feb. 17, 2022

(30) Foreign Application Priority Data
Sep. 19, 2018 (GB) ...................................... 1815256

(51) Int. Cl.
*G01N 29/04* (2006.01)
*G01N 29/22* (2006.01)
(Continued)

(52) U.S. Cl.
CPC ........... *G01N 29/04* (2013.01); *G01N 29/223* (2013.01); *G01N 29/326* (2013.01); *G01N 29/44* (2013.01);
(Continued)

(58) Field of Classification Search
CPC .......... G01N 29/00–12; G01N 29/223; G01N 29/326; G01N 29/44–52; G01N 2291/023; G01N 2291/0289; G01N 2291/2634
See application file for complete search history.

(56) References Cited

U.S. PATENT DOCUMENTS 8,892,384 B2 * 11/2014 Pado ....................... G01M 7/00
73/1.82
2008/0255771 A1   10/2008 Beard
(Continued)

FOREIGN PATENT DOCUMENTS

CA     3072053 A1 * 2/2019 ............ G01B 17/02
CN     104181237 A   12/2014
(Continued)

OTHER PUBLICATIONS

Japanese Office Action for Application No. 2021-515204, dated Dec. 12, 2022, 11 pages.
(Continued)

*Primary Examiner* — Nguyen Q. Ha
(74) *Attorney, Agent, or Firm* — McCarter & English, LLP

(57) ABSTRACT

A method of processing a signal is disclosed. The method comprises receiving a signal obtained from measuring a structure under a given set of environmental and/or operational conditions, the signal comprising a set of amplitude values which depend on position in the signal and adjusting the amplitude value each of at least two of the amplitude values independently according to the position of the amplitude value in the signal and according to the given environmental and/or operational conditions.

34 Claims, 13 Drawing Sheets

(51) Int. Cl.
   *G01N 29/32*   (2006.01)
   *G01N 29/44*   (2006.01)
(52) U.S. Cl.
   CPC ............... *G01N 2291/023* (2013.01); *G01N 2291/0289* (2013.01); *G01N 2291/2634* (2013.01)

(56) References Cited

U.S. PATENT DOCUMENTS

| | | | |
|---|---|---|---|
| 2014/0025316 A1* | 1/2014 | Harley | .................. G01N 29/44 702/35 |
| 2015/0053009 A1 | 2/2015 | Yan et al. | |
| 2018/0231501 A1* | 8/2018 | Findikoglu | ........ G01N 29/4472 |

FOREIGN PATENT DOCUMENTS

| | | | | |
|---|---|---|---|---|
| CN | 107748208 A | * | 3/2018 | ........... G01N 29/326 |
| GB | 2403009 A | | 12/2004 | |
| GB | 2491986 A | | 12/2012 | |
| JP | 2016-114570 A | | 6/2016 | |
| JP | 2018-119799 A | | 8/2018 | |
| WO | WO-2015134596 A1 | * | 9/2015 | ............... G01L 1/16 |
| WO | 2017/099852 A1 | | 6/2017 | |

OTHER PUBLICATIONS

Konstantinidis et al., An investigation into the temperature stability of a guided wave structural health monitoring system using permanently attached sensors. IEEE Sensors Journal. May 2007;7(5):905-12.

International Search Report and Written Opinion for Application No. PCT/GB2019/051717, dated Jan. 14, 2020, 22 pages.

United Kingdom Search Report for Application No. GB1815256.1, dated Mar. 28, 2019, 6 pages.

* cited by examiner

SIGNAL PROCESSING

CROSS-REFERENCE TO RELATED APPLICATIONS

This application is a 35 U.S.C. § 371 national stage filing of International Application No. PCT/GB2019/051717, filed on Jun. 19, 2019, which claims priority to United Kingdom Patent Application No. 1815256.1, filed on Sep. 19, 2018. The entire contents of each of the aforementioned applications are incorporated herein by reference.

FIELD

The present invention relates to signal processing, particularly, but not exclusively processing a signal obtained from a measurement, such as a guided or bulk elastic wave measurement, of a structure, such as a pipe, rail or plate.

BACKGROUND

Systems based on guided wave sensing are widely used to detect damage in structures found in numerous fields, such as aerospace, energy and oil & gas. The main advantage of these systems over conventional ultrasonic inspection is their ability to inspect large areas of the structure from a single sensor location. In a typical usage of guided wave systems, the so-called "one-off inspection", the sensor is deployed on the structure and it is then removed after taking one (or a few) measurements. In this setting, it is important to identify a suitable testing interval that would allow potential defects to be detected before they are able to fully grow into a structural failure. Such an interval is application-specific, and it is generally not trivial to establish. For this and other reasons, such as dealing with cases of high access costs (e.g., pipes buried underground), recently there has been a move towards permanent installation of guided wave sensors. Permanently-installed systems enable frequent monitoring (e.g., daily), thus potentially allowing for the detection of damage at earlier stages. Furthermore, after detection, the progression of damage can be monitored, so that predictions on the remaining life of the structure can be attempted.

Theoretically, by implementing such a Structural Health Monitoring (SHM) approach, smaller defects can be found than when using one-off inspections, in particular when they occur in the vicinity of structural features. This is usually achieved by comparing new measurements with baseline records, where any change in signals could represent a defect signature. Unfortunately, this procedure is often hindered by the effects of changing environmental and operational conditions (EOCs), primarily temperature, but also pipe load and contents, which are also responsible for changes in the signals, therefore degrading the damage detection performance.

One effect of temperature that has been extensively studied is that it modifies the velocity of the guided wave modes, primarily by influencing the Young's modulus of the material. Therefore, given an ultrasonic signal measurement $x(t)$, the effect of a change in temperature T is to scale the measured time domain signal, namely $$T\{x(t)\} = x(\alpha t) \quad (1)$$

where a scaling factor $\alpha$ is unknown and is estimated.

Equation (1) is a simple model since interference of multiple modes (possibly dispersive) tends to produce a non-exact scaling. It has been shown experimentally, however, that making use of the model yields, in practical terms, satisfactory results. To address this problem, two techniques have been proposed, namely the optimal signal stretch and the local peak coherence techniques.

Examples of the optical stretch technique can be found in G. Konstantinidis et al.: "An Investigation into the Temperature Stability of a Guided Wave Structural Health Monitoring System Using Permanently Attached Sensors", IEEE Sensors Journal, volume 7, pages 905-912 (2007), A. J. Croxford et al.: "Efficient temperature compensation strategies for guided wave structural health monitoring", Ultrasonics, volume 50, pages 517-528 (2010), T. Clarke et al.: "Guided wave health monitoring of complex structures by sparse array systems: Influence of temperature changes on performance," Journal of Sound and Vibration, volume 329, pages 2306-2322 (2010) and J. B. Harley and J. M. F. Moura: "Scale transform signal processing for optimal ultrasonic temperature compensation", IEEE Transactions on Ultrasonics, Ferroelectrics and Frequency Control, volume 59, pages 2226-2236 (2012)

Examples of the local peak coherence technique can be found in J. E. Michaels and T. E. Michaels: "Detection of structural damage from the local temporal coherence of diffuse ultrasonic signals", IEEE Transactions on Ultrasonics, Ferroelectrics and Frequency Control, volume 52, pages 1769-1782 (2005) and Yinghui Lu and J. E. Michaels: "Feature Extraction and Sensor Fusion for Ultrasonic Structural Health Monitoring Under Changing Environmental Conditions", IEEE Sensors Journal, volume 9, pages 1462-1471 (2009).

Another potential, detrimental effect of changing EOCs (in particular, temperature) on the inspection system is an induced variation of the wave modes generated and sensed by the system itself. This, in turn, results in changes in coherent noise (which, as opposed to random noise, cannot be eliminated by averaging multiple measurements, as it is an unwanted signal excited by the actuators alongside the desired signal) affecting the measurements in different ways throughout the signal.

SUMMARY

According to a first aspect of the present invention there is provided a method of signal processing. The method comprises receiving a signal obtained from measuring a structure under a given set of environmental and/or operational conditions, the signal comprising a set of amplitude values which depend on position in the signal (e.g., along a signal having one variable), and, for at least two of the amplitude values, adjusting the amplitude value independently according to position of the amplitude value in the signal and according to the given environmental and/or operational conditions. Thus, each amplitude value (of the at least two of the amplitude values) is independently adjusted according to its respective position in the signal and according to the given environmental and/or operational conditions.

This can help to reduce or even suppress the effect of variations in coherent noise which can arise due to changes in environmental and/or operational conditions, such as changes in temperature, load, contents, coating and/or any other factors which might affect the signal.

The signal may be a one-dimensional signal (i.e., having only one variable) or may be a two-dimensional signal (i.e., having two variables). The position in the signal may correspond uniquely to a position in the structure (which may be a one-dimensional position, such as a distance along the structure, or a two-dimensional position, such as an x-y position, in the structure).

The method may comprise adjusting the amplitude value of each of some, a majority, substantially all or all of the amplitude values in the signal independently. An amplitude value may be adjusted by adjusting polarity and/or magnitude depending on the position of the amplitude value.

The signal may be obtained from an elastic wave measurement of the structure. The elastic wave is preferably an ultrasonic wave. The elastic wave may be an acoustic wave. The signal is preferably obtained from a guided wave measurement of the structure, more preferably from a guided ultrasonic wave measurement of the structure. The signal may be obtained from a bulk wave measurement of the structure. The signal may be obtained from an electromagnetic wave measurement of the structure.

The method may further comprise pre-processing the signal before adjusting the amplitude values of each of the at least two amplitude values. The pre-processing of the signal may comprise performing time-stretch compensation.

The method may further comprise determining at least one of the environmental and/or operational conditions at which the signal is measured from the signal, such as the temperature at which the signal is measured. The method may comprise performing a time-stretch compensation using a scaling factor and determining a temperature in dependence upon the scaling factor. The temperature may be a temperature relative to a baseline temperature.

This can be used to compensate for changes in transducer frequency response and/or for temperature-dependent wave attenuations.

The method may further comprise performing time-stretching temperature compensation and compensating for frequency shifts due to the time-stretching temperature compensation.

The signal may comprise a component or more than one component of a measured signal. The component or the more than one component may be obtained by processing the measured signal using a signal decomposition method, such as independent component analysis. The signal may be obtained after performing independent component analysis.

The method may comprise performing the method for a plurality of signals obtained at different times.

The method may further comprise determining whether there is a change in an adjusted value over time for a given position in the signal. The method may comprise determining whether a change in adjusted value between first and second times exceeds a predetermined value. The method may comprise determining whether adjusted values for a given position changes monotonically over time and in dependence upon a positive determination, generating a signal for notifying a user.

The method may comprise, prior to receiving the signal, in a calibration phase: receiving a plurality of signals obtained from measuring the structure at different environmental and/or operational conditions and generating, for each position of a plurality of different positions, a function of amplitude against set of environmental and/or operational conditions, each function usable for adjusting an amplitude value at a given position.

The method may further comprise causing a measurement and, in response to causing the measurement, receiving the signal.

The structure may be a pipe. The structure may be an elongate structure, such as a bar, rail or pipe, or an extended, plate-like structure, such as a plate or wall.

The method may be performed in response to receiving a measurement, i.e., every time a new measurement is received. Alternatively, the method may be performed after receiving at least one measurement, in response to a trigger, for example, every time a batch of measurements is received.

According to a second aspect of the present invention there is provided a computer program which, when executed by at least one processor, causes the at least one processor, to perform the method of the first aspect.

According to a third aspect of the present invention there is provided a computer program product comprising a machine-readable medium, which may be non-transitory, storing the computer program of the second aspect.

According to a fourth aspect of the present invention there is provided apparatus comprising at least one processor and memory, wherein the at least one processor is configured to perform the method of the first aspect.

According to a fifth aspect of the present invention there is provided an inspection system comprising a sensor for measuring a structure and providing a measurement signal and apparatus according to the fourth aspect which configured to receive the measurement signal and to obtain the signal from the measurement signal or to use the measurement signal as the signal.

The sensor is preferably permanently installed on the structure.

Certain embodiments of the present invention seek to reduce or even suppress the effect of the temperature-induced variations of coherent noise. Concurrently, these certain embodiments can also solve one or more other direct or indirect consequences of changing EOCs. The methodology herein disclosed can be potentially applied to guided elastic waves (such as ultrasonic and acoustic guided waves), bulk elastic waves (such as ultrasonic and acoustic bulk waves), guided electromagnetic waves, and other forms of monitoring systems in a variety of fields and using different modes, but it is herein described as applied to a pipe monitoring system based on the fundamental torsional mode $T(0,1)$.

Typically, pipe monitoring systems employ an array of transducers linked through a ring and put in contact with the external surface of the pipe. The vast majority of commercially available systems are designed to excite the fundamental torsional wave mode $T(0,1)$ in the pipe. However, in any transduction system concurrent excitation of other unwanted modes may occur, such as circumferential modes, whose energy mostly propagates in the circumferential direction around the sensor location, as well as other modes primarily traveling along the pipe. The latter can be both longitudinal and flexural modes. The same imperfections are also responsible for the transducers being able to pick up those unwanted modes that were generated. Changing EOCs can cause shifts in such imperfections, which in turn cause differences in the unwanted modes being generated and detected (i.e., in the coherent noise), which is what the methods herein disclose seek to reduce and even eliminate.

According to a sixth aspect of the present invention there is provided a method of compensating structural health monitoring measurements at two or more positions on a structure under test for environmental and other changes by initially measuring signals across a range of environmental conditions (EOCs), evaluating the change in the signals corresponding to different locations on the test structure, producing a compensation function for the environmental effects and applying the compensation function to newly acquired signals to give a more reliable assessment of whether structural change has occurred at any of the locations of interest.

The EOC may include change of temperature, load and/or contents, coating and other factors affecting the signal. The method may be used for ultrasonic guided wave monitoring or other methods in which the signal is a function of time and/or space. The method may comprise processing a direct signal measurement or a signal after processing with, for example, ICA. The method may compensate for different effects, such as transducer frequency response, attenuation and/or frequency shifts.

According to a seventh aspect of the present invention there is provided a method performed by a processing device that after the acquisition of measurements taken over a number of different EOCs suppresses the EOC-induced variations of coherent noise by compensating independently at different positions on the structure (at different signal samples) rather than on the structure as a whole (i.e., on the entire signal at once).

The method may further comprise detection of one or more areas of structural change in the structure, based on a change obtained by comparing a signal with at least one previous signal obtained from the structure. The detection of areas of structural change might become clearer by analysing the evolution of the residuals over multiple signals, which might show for example monotonic trends. The structural change may comprise a degradation of the structure.

For producing temperature—amplitude curves and other EOC—amplitude curves, an indirect measure of temperature or EOC may be used, such as the scaling factor resulting from the application of time-stretching temperature or EOC compensation algorithms.

The procedure may be applied to signatures deriving from specialized signal processing techniques applied to the waveforms, such as independent component analysis, singular value decomposition, and possibly others.

The method may further comprise that the effects of transducer frequency response changes (such as signal peak amplitude, signal tail and signal phase shift) due to temperature and/or other EOCs fluctuations are also compensated for.

The method may further comprise that the effects of temperature-dependent wave attenuations and/or other EOC-dependent wave variations are also compensated for.

The method may further comprise that the effects of frequency shifts due to the application of a time-stretching temperature compensation algorithm and/or another time-stretching EOC compensation algorithm are also compensated for.

BRIEF DESCRIPTION OF THE DRAWINGS

Certain embodiments of the present invention will now be described with reference to the accompanying drawings in which:

FIGS. 11c and 11d show the same two signals shown in FIGS. 11a and 11b after applying a simulated attenuation and FIGS. 11e and 11f show the same two signals after normalizing them at the end pipe reflection;

DETAILED DESCRIPTION

System

Figure 1:
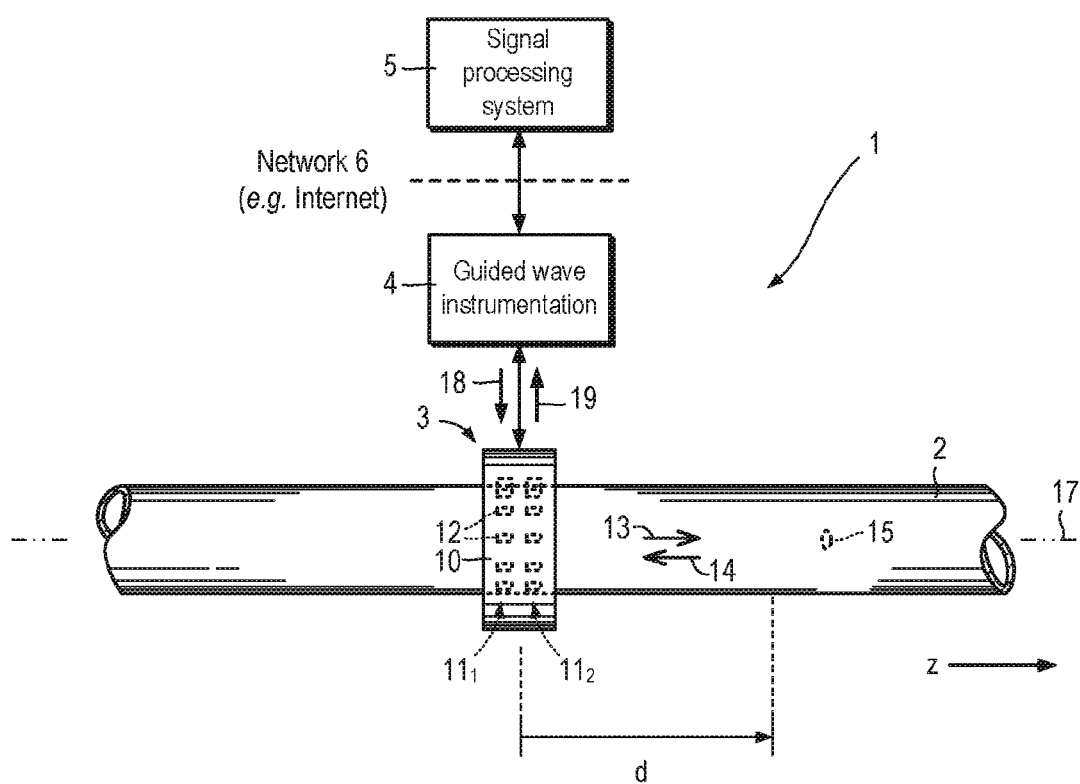
FIG. 1 is schematic diagram of a pipe and a guided wave testing system which includes a transducer assembly, guided wave instrumentation and a computer system.

Referring to FIG. 1, a system 1 for inspecting a structure 2 in the form of a pipe 2 or structure using guided ultrasonic waves is shown. The inspection system 1 includes a transducer assembly 3 (or "sensor") which is preferably permanently installed on the pipe 2, guided wave instrumentation 4, and a signal processing system 5. The structure may take the form of an extended structure such a plate, panel or rail. The transducer assembly 3 may take the form of an inspection ring, although other forms of transducer assembly 3 may be used.

The transducer assembly 3 comprises a band to (or "collar") or other suitable structure which supports first and second arrays $11_1$, $11_2$ of transducers 12 for generating ultrasonic waves 13 in the pipe 2 and detecting waves 14 reflected from defects 15. There may be only one array of transducers. The transducers 12 preferably take the form of piezoelectric transducers and an example of suitable transducers can be found in GB 2 479 744 A which is incorporated herein by reference. Each array $11_1$, $11_2$ may comprise, for example, 16 or 32 transducers 12, although there may be fewer than 16, between 16 and 32 or more than 32 transducers 12. The transducers 12 can be grouped into sectors or channels (not shown), for example, eight channels (not shown), each channel (not shown) consisting of between 2 to 9 or more transducers 12.

In this example, each array $11_1$, $11_2$ are arranged such that, when the inspection ring 3 is installed, the transducers 12 are disposed around the periphery of the pipe 2. The first and second arrays $11_1$, $11_2$ are offset across the width of the band 10 such that, when the inspection ring 3 is installed, the two arrays $11_1$, $11_2$ are offset along a longitudinal axis 17 of the pipe 2. Examples of suitable inspection rings include the Compact™ ring, the High Definition (HD) solid ring, gPIMS® ring and other rings available from Guided Ultrasonics Ltd. (London, UK). Two separate rings 3, each having only a single array of transducers, can be used. Even for a pipe, an inspection ring 3 need not be used. For a plate, a suitable planar array of transducers can be used, i.e., a ring is not used.

The guided wave instrumentation 4 includes a signal generator (not shown) capable of generating rf signals 18 having a suitable frequency, which is usually of the order tens of kilohertz (kHz), and a suitable shape, such as, for example, a k-cycle suitably-windowed tone burst, where k is a positive number equal to or greater than 1, preferably an integer or half integer, preferably taking a value in the range $3 \leq k \leq 10$, and where a suitable windowing function can be a Gaussian function. The signal generator (not shown) feeds the rf signal 18 to a transmitter transducer 12 which converts the signal 18 into a guided wave in the pipe wall 2.

The receiver transducer 12 converts a received guided wave into an electrical signal 19. The receiver transducer 12 feeds the electrical signal 19 to a signal receiver (not shown). The signal receiver (not shown) may include an amplifier (not shown) and an analogue-to-digital converter (not shown) which generates a digitized signal of the electrical signal 19.

The guided wave instrumentation 4 and signal processing system 5 may be integrated into a single unit. The signal processing system 5 may take the form of a lap-top, tablet or other form of portable computer. The signal processing system 5 may be remotely located, e.g., in a server farm, connected to the rest of the system via a communications network 6 which may include, for example, the Internet. Examples of suitable guided wave instrumentation include G4 Mini (Full), Wavemaker $G_4$, gPIMS Mini Collector and other instruments available from Guided Ultrasonics Ltd. (London, UK).

Figure 2:
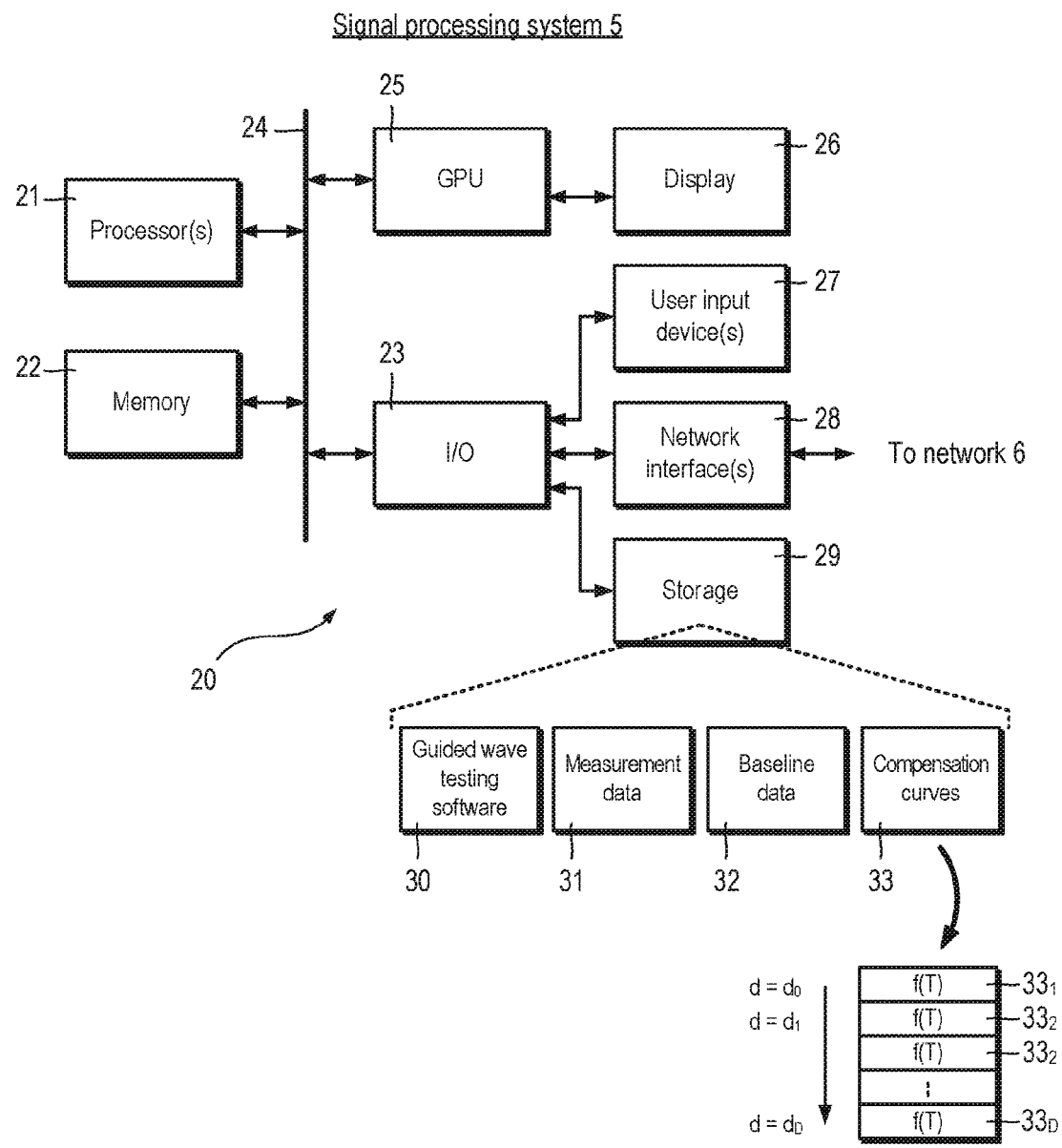
FIG. 2 is a schematic block diagram of the computer system shown in FIG. 1.

Referring also to FIG. 2, the signal processing system 5 is implemented by a computer system 20 which comprises at least one processor 21, memory 22 and an input/output module 23 interconnected by a bus system 24. The system 20 may include a graphics processing unit 25 and a display 26. The system 20 may include user input device(s) 27 such as keyboard (not shown) and pointing device (not shown), a network interface 28 and storage 29 for example in the form of hard-disk drive(s) and/or solid-state drive. The storage 29 stores guided wave testing software 30, measurement data 31 and baseline data 32 and compensation curves 33. If the guided wave instrumentation 4 and signal processing system 5 are co-located (e.g., the signal processing system 5 takes the form of a lap-top computer connected directly to the instrumentation 4) or integrated into a single unit, then the computer system 20 may be used for controlling guided wave instrumentation 4 and so the storage 20 may include guided wave testing software (not shown).

An example of a structure monitoring system is also described in D. N. Alleyne et al.: "Rapid, long range inspection of chemical plant pipework using guided waves", AIP Conference Proceedings, volume 557, pages 180 to 187 (2001) which is incorporated herein by reference.

The system 1 may be used to inspect the pipe 2 to detect and/or to monitor development of cracks, corrosion and other defects (not shown) in the pipe 2 using guided waves 13, 14 in pulse-echo mode.

Temperature Compensation Method

A method of compensating for temperature-dependent variations in coherent noise can be applied to measured signals, preferably in the form of measured signals after compensating for temperature-dependent wave speed, for example using the process described in J. B. Harley and J. M. F. Moura: "Scale transform signal processing for optimal ultrasonic temperature compensation" ibid., or on signatures resulting from signal processing techniques such as independent component analysis (ICA). Reference is made to C. Liu et al.: "Efficient generation of receiver operating characteristics for the evaluation of damage detection in practical structural health monitoring applications," Proceedings of the Royal Society A Mathematical Physical Engineering Sciences, volume 473 (2017) which is incorporated herein by reference. Other forms of signal processing, however, may be used, such as singular value decomposition.

Figure 3:
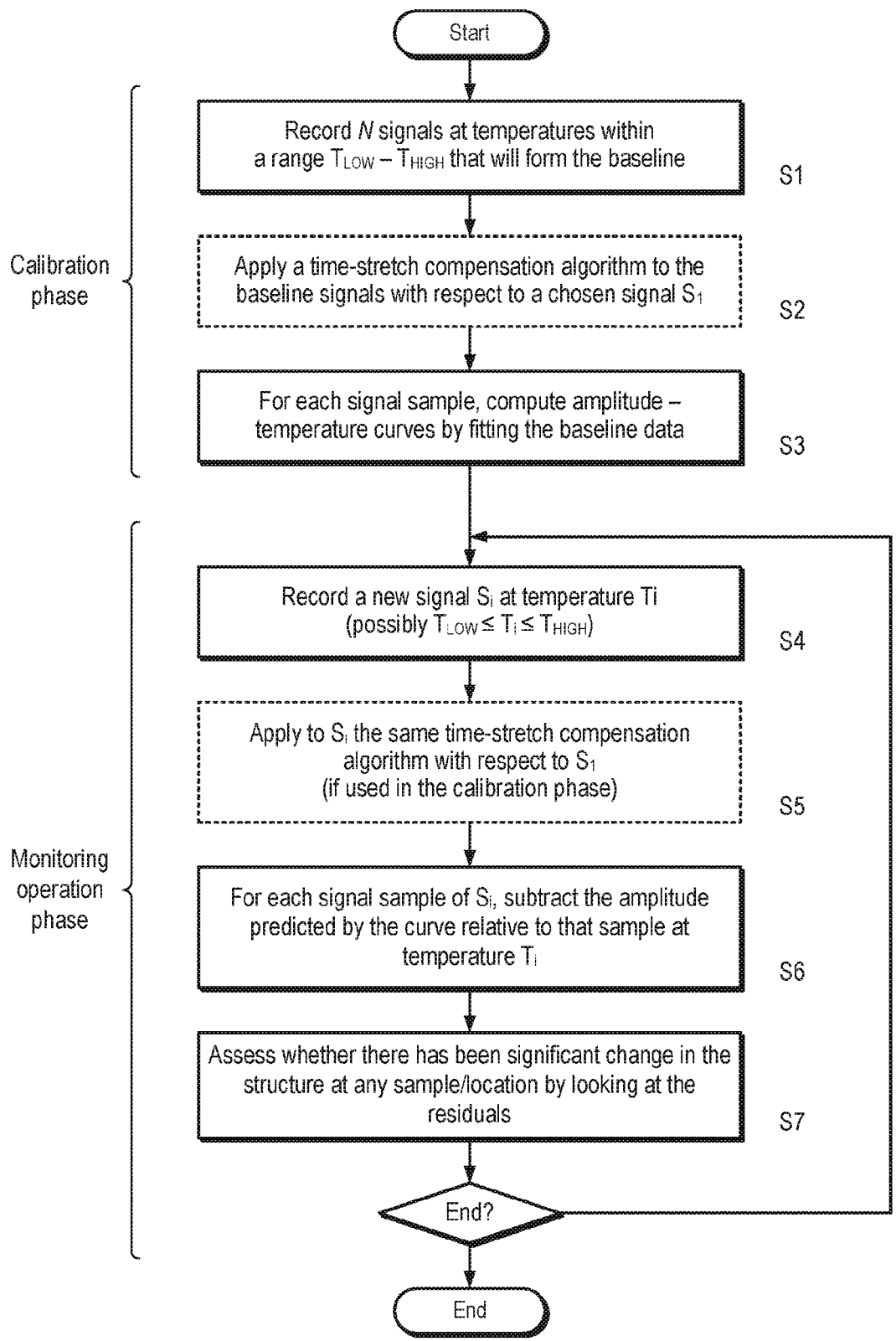
FIG. 3 is a flow chart of a process of assessing the integrity of a structure.

Referring to FIG. 3, a method of compensating for temperature-dependent variations in coherent noise will now be described.

The method is generally divided into two phases (or "stages"), namely a calibration phase (steps S1 to S3) and a monitoring operation phase (steps S4 to S7).

In the calibration phase, the guided wave instrumentation 4 obtains a n sets of waveform data indicative of propagation of a generated signal through a structure 2 (such as a pipe), in an initial state, at different times and at different temperatures within a temperature range $T_{LOW}$-$T_{HIGH}$ (step S1). This is used to form a so-called "baseline". The greater the number n of sets of waveform data, the more accurate the baseline. Preferably $n \geq 2$ and more preferably $n > 10$. In the initial state, the structure is deemed to be defect free. If a defect is already present before or during acquisition of these waveforms, the method would not give an indication of the pre-existing defect, but would still be able to detect further damage increases taking place after the baseline. Optionally, the guided wave instrumentation 4 may apply a time-stretch temperature compensation of the baseline signals with respect to a chosen signal $S_1$ (step $S_2$). For example, this may be achieved by applying the method described in J. B. Harley and J. M. F. Moura: "Scale transform signal processing for optimal ultrasonic temperature compensation" ibid., which can be used to better align signal samples over different waveforms, wherein each signal sample corresponds to a specific location in the structure 2. The signal processing system 5 computes a set of signal amplitude—temperature curves 33 for each position d along the structure 2 (step S3). This is achieved by fitting the baseline data with an appropriate fitting curve, such as a polynomial of some order. In some examples, the guided wave instrumentation 4 may compute the set of signal amplitude—temperature curves 33 for each position d along the structure 2.

In the monitoring operation phase, the guided wave instrumentation 4 acquires a waveform $S_i$ when the structure 2 is in an unknown state at some temperature $T_i$ (step S4). The temperature $T_i$ may lie in the range $T_{LOW} \leq T_i \leq T_{HIGH}$. If the temperature $T_i$ lies outside of the baseline temperature range, then accuracy will depend on accuracy of extrapolation of the fitting curves. In the unknown state, damage may have occurred at one or more locations.

The guided wave instrumentation 4 may, if applied to the baseline signals, apply the same time-stretch compensation algorithm applied to the baseline signals with respect to the previously chosen signal $S_1$ to $S_i$ (step S5).

The guided wave instrumentation 4 subtracts, at each signal sample of $S_i$, the value predicted by the curve computed for that sample and which is valid for a temperature equal to $T_i$ (step S6). The guided wave instrumentation 4 assesses whether there has been significant change in the structure 2 by looking at the residuals at each signal sample (step S7). For example, a change greater than variations in residual or component amplitude (i.e., noise) seen with time in the calibration phase can be used as a threshold.

The guided wave instrumentation 4 continues to acquire new signals for a continuous monitoring of the structural integrity (steps S4 to S7).

As will be explained in more detail later, a signal decomposition processing algorithm, such as independent component analysis, and/or other signal processing, such as temperature compensation, can be applied to the acquired waveforms before the noise-reducing processing is performed.

Signal Amplitude Temperature Compensation

Referring to FIGS. 1 to 4, a first example of the application of the method of compensating for temperature-dependent variations in coherent noise will now be described.

Figure 8:
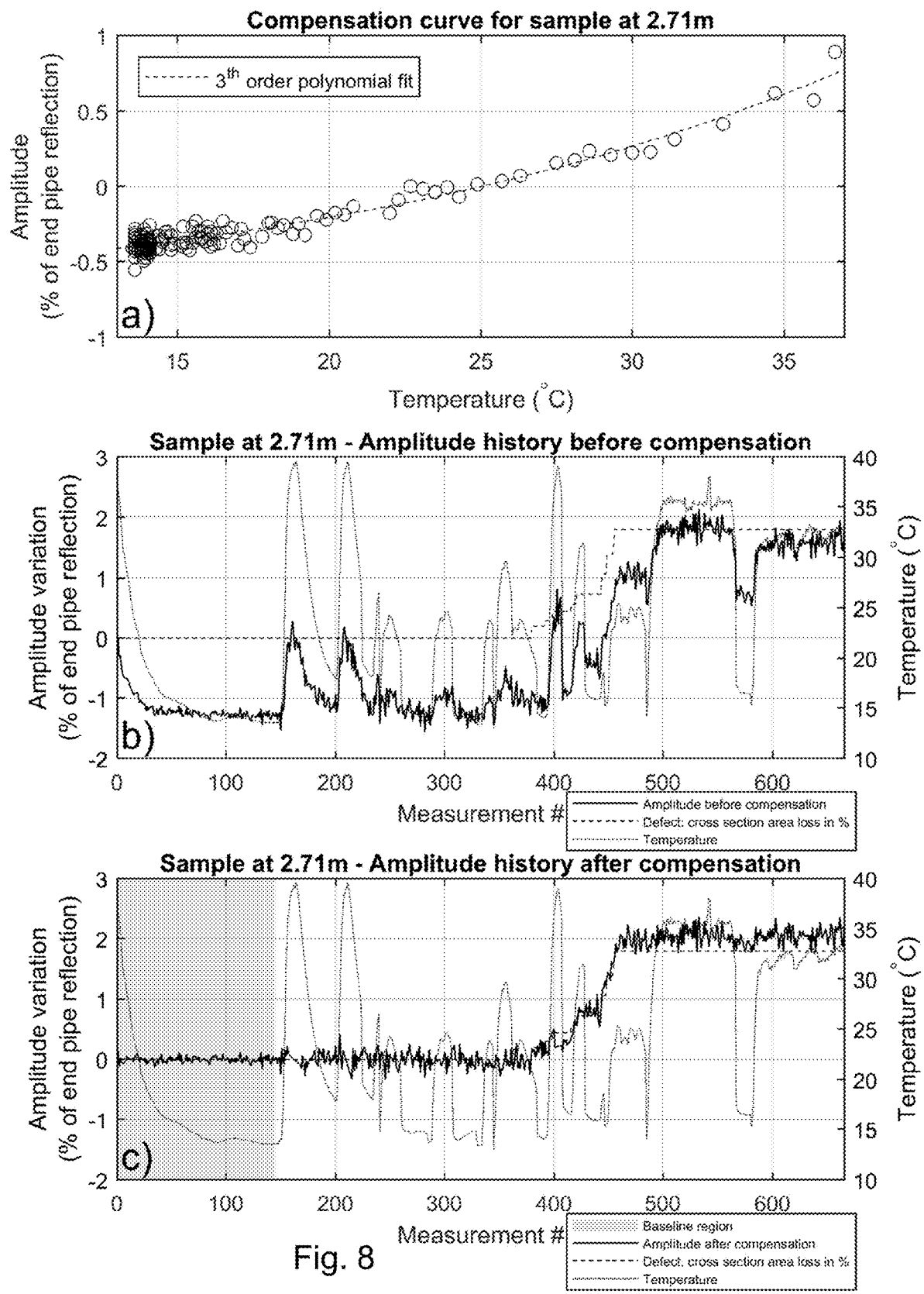
FIGS. 8a to 8c illustrate application of amplitude compensation on a sampling point in correspondence to the defect.

The pipe monitoring system r is installed, in this example, on an 8-inch, schedule 40 pipe 2 and set to use the $T(0,1)$ mode with frequencies centred at 25.5 kHz. The transmitted signal 13 is an 8-cycle toneburst. Using the location of the sensor 3 as a reference, in the direction of interest the pipe was 4.5 m long and featured a weld (not shown) at 1.5 m. A defect was artificially introduced at 2.5 m after the $379^{th}$ measurement and was gradually deepened. The cross-section area loss in % due to the presence of the defect is plotted (in chain) in FIG. 8.

Figure 4:
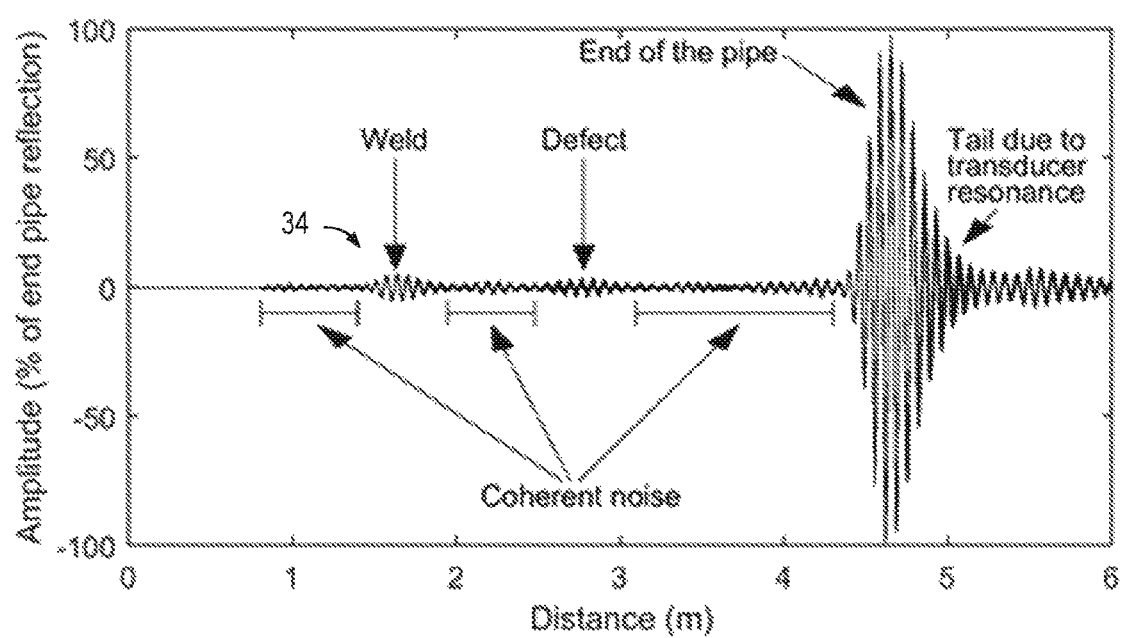
FIG. 4 illustrates signals recorded by a pipe monitoring system.

In FIG. 4, the signals are normalized to an end pipe reflection and stretched to compensate for the temperature-dependent wave speed using the process described in J. B. Harley and J. M. F. Moura: "Scale transform signal processing for optimal ultrasonic temperature compensation" ibid. The sample numbers are converted to distance from the sensor 3 by using the $T(0,1)$ wave speed.

Figure 5:
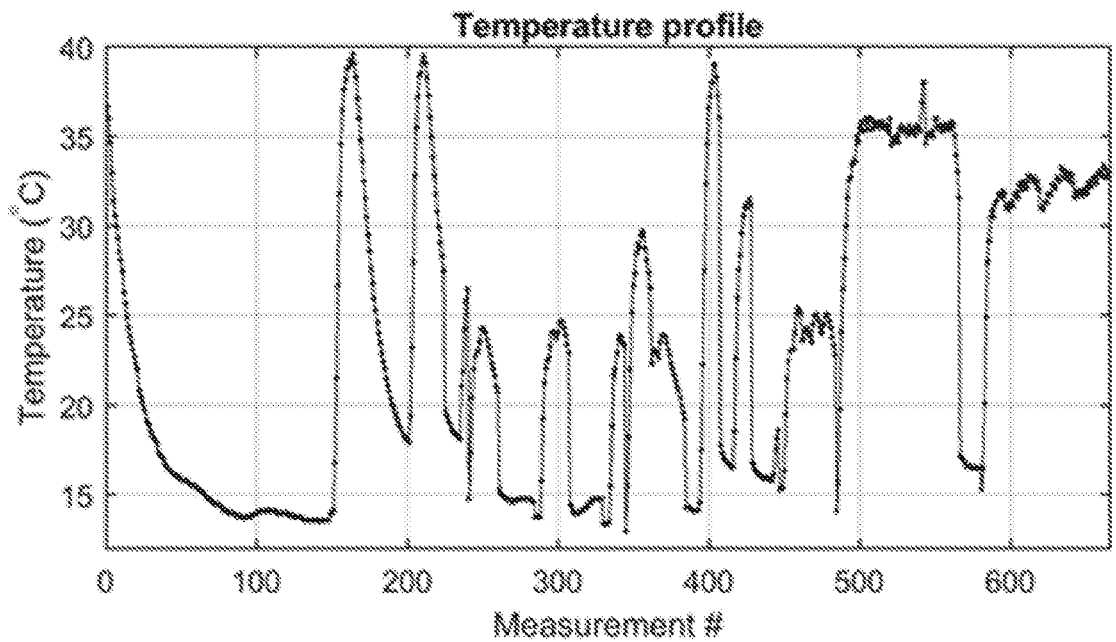
FIG. 5 is a plot of temperature measured on a pipe near a sensor.

Referring to also FIG. 5, the pipe 2 is subjected to heating and cooling cycles. FIG. 5 shows measured temperature at the location of the sensor against measurement number. The temperature fluctuates between about 14° C. and 40° C.

Figure 6:
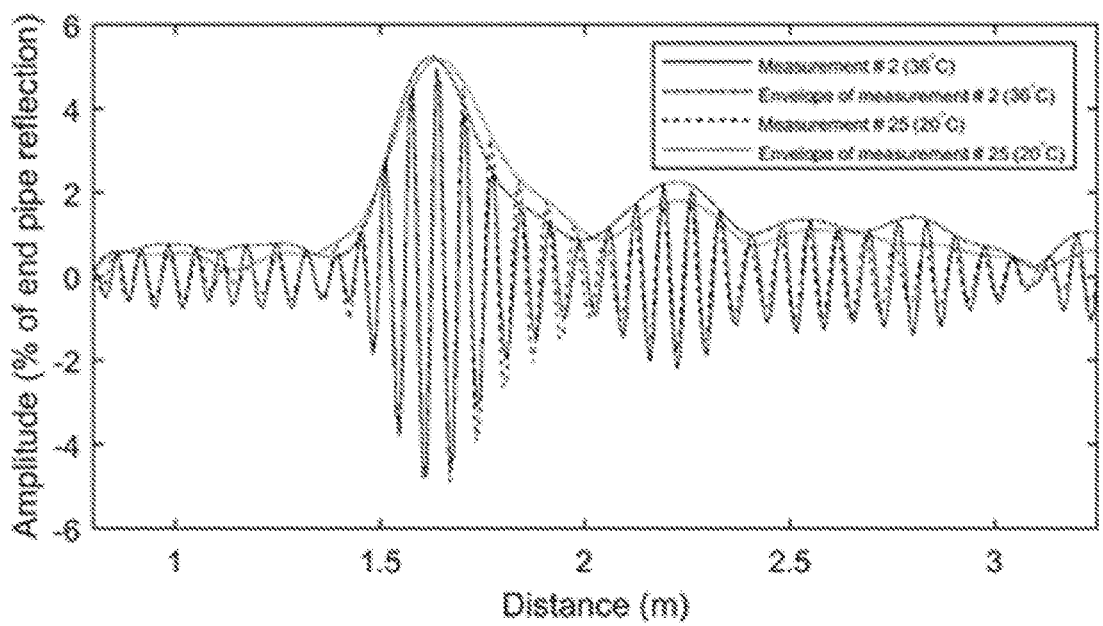
FIG. 6 illustrates a comparison of coherent noise at two distinct temperatures.

Referring also to FIG. 6, magnified plots of two signals, i.e. variation in normalised signal amplitude against distance d from the sensor 3, recorded at temperatures of 36° C. and 20° C. are shown. FIG. 6 shows the differences in coherent noise in the two cases. It could be inferred that before the weld at 1.5 m the noise is mainly due to circumferential modes. After the weld, the contribution of slower flexural and longitudinal modes to the coherent noise is also present. The methods herein described are able to compensate for this noise and for other phenomena hereinafter disclosed without the need for any prior knowledge of its source.

As mentioned earlier, there is an assumption that, for the first N measurements (i.e., the baseline), no damage growth occurs in the pipe 2. If, instead, some damage does grow while acquiring the baseline, the trend associated with its occurrence may be removed, but further damage increases taking place after the baseline would still be detected. There is no requirement that the pipe in its initial state is undamaged, simply that no significant new growth occurs. It is preferred that the baseline measurements be taken across the temperature range expected during normal operation of the pipe 2 being monitored. If the temperature exceeds this range, then out-of-range measurements can be excluded from analysis.

Referring to FIGS. 4, 7a and 7b, for each location along the pipe (i.e., $d=d_0, d_1, d_2, \ldots, d_N$), a compensation curve $33_0, 33_1, 33_2, \ldots, 33_D$ of amplitude against temperature is computed by fitting available baseline data. The goal of each curve 33 is to quantify the expected amplitude of the signal for a pipe in its original condition at that specific location and at each temperature value across the baseline range. If measurements of temperature are not available, other indirect measures of temperatures can also be used, such as the stretching factors computed by using the process described in J. B. Harley and J. M. F. Moura: "Scale transform signal processing for optimal ultrasonic temperature compensation" ibid.

Once the fitting curves $33_0, 33_1, 33_2, \ldots, 33_D$ are computed, they can be used to subtract the quantity prescribed by the pertinent curve at the pertinent temperature from the measured amplitude at each sampling point (i.e., location on the pipe). This procedure is referred to as "amplitude compensation".

FIGS. 7b and 7c and FIGS. 8b and 8c show, for two different positions (namely d=1.83 m and d=2.71 m) plots of amplitude against measurement number before and after compensation. In each case, measurements 1 to 145 were used as baseline.

FIGS. 7a to 7c shows the case of a sample at 1.83 m, which is still dominated by the tail of the reflection from the weld 34 (FIG. 4), whereas FIGS. 8a to 8c shows a sample at 2.71 m, which is expected to present reflections from the defect after its introduction at the $380^{th}$ measurement.

As noted in the respective legends of FIGS. 7a and 8a, third degree polynomials are chosen for the best fit (i.e., least-squares best fit) for the data available from each sample. Different degrees of polynomial or different types of fitting curve can be used.

FIGS. 7b, 7c, 8b and 8c show amplitude variations over time for the two sampling points (locations) considered, comparing the trend available before applying the amplitude compensation with the one obtained after applying it. The temperature profile is also overlaid with these trends in order to show how, before applying the amplitude compensation, the amplitudes fluctuate with a strong correlation to temperature.

In contrast, after performing compensation, the fluctuations are largely suppressed. The resulting amplitude history in FIG. 7c shows a flat trend, as expected in defect-free areas of the pipe, whereas the one in FIG. 8c shows a monotonically-increasing trend which is in close agreement with the graph that indicates the known defect growth (which was a roughly linear growth between measurements 380 and 456). It is clear that, after removing fluctuations solely due to changing temperature, it becomes much easier to detect monotonic trends due to the occurrence of actual damage.

Application to Independent Component Analysis Processing

Compensation can also be applied to signatures resulting from specialized signal processing techniques, such as ICA. When dealing with ICA results, the amplitude compensation is applied to a weight function associated with each component. In fact, the weight functions represent a trend of the particular component over the range of measurements.

Referring to FIGS. 9a to 9d and FIGS. 10a to 10d, examples of processing two components obtained from the application of ICA to the signals shown in FIG. 4 will now be described.

Figure 7:
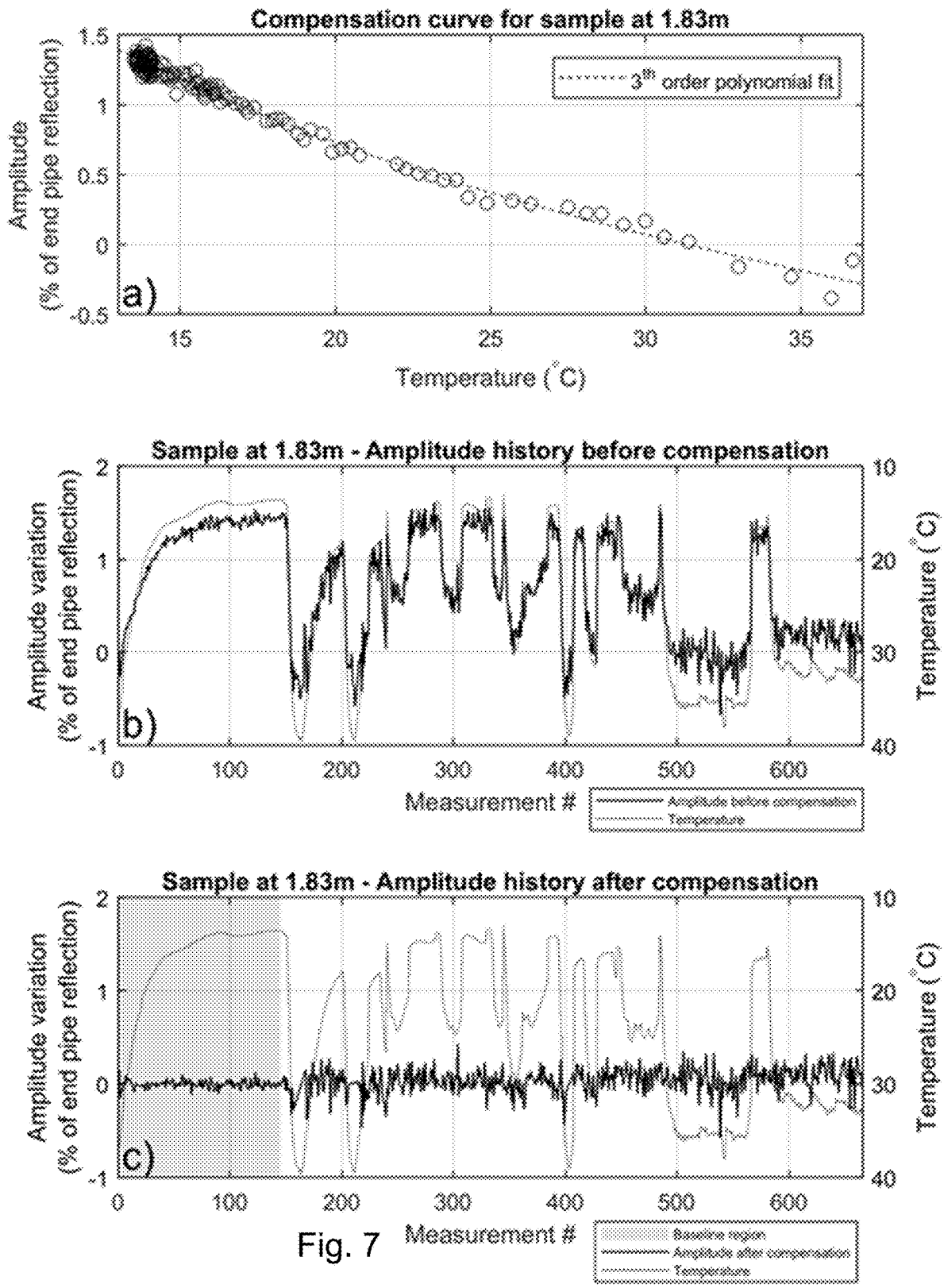
FIGS. 7a to 7c illustrate application of amplitude compensation on a sampling point in a defect-free area of the pipe.

FIG. 9a shows a component whose energy is located in a defect-free area of the pipe, just after the weld (near and around the sampling point considered in FIG. 7). As hereinbefore described, a $3^{rd}$ degree polynomial is chosen as the best fit (in a least-squares sense) for the data available from its weight function in the baseline region, which was again chosen to include measurements 1 to 145. The results shown FIGS. 9c and 9d resemble the ones shown in FIGS. 7b and 7c. Similarly, FIG. 10a shows a component whose energy represents reflections from the defect and which is in the same area as the sampling point chosen to generate FIG. 8. Again, the results shown in FIGS. 10c and 10d are in good agreement with the ones shown in FIGS. 8b and 8c.

Compensation for Transducer Frequency Response Changes

Transduction systems are often operated close to resonance as this gives higher amplitudes. A downside, however, is that their frequency response can be temperature sensitive. For example, FIG. 4 shows results from a piezoelectric system in which the signal generated by the transducer when excited with an 8-cycle windowed toneburst icy clearly has more than 8 cycles and exhibits a tail. Similar effects are seen with EMAT systems due to the effective presence of an LCR circuit. The temperature-dependent resonance behaviour can also be observed in FIG. 6, where the reflection from the weld in the signal recorded at 20° C. has an overall higher energy than the one at 36° C. In particular, three distinct and concurrent effects of such temperature dependent resonance behaviour are usually found, namely different signal peak amplitude, different length of the signal tail after the peak value and signal phase shift. Each of these three effects can produce signal amplitude variations across measurements taken at different temperatures. The methods herein described can also compensates for these three effects, as the amplitude variations that they cause repeat themselves regularly at any given temperature. In fact, both FIG. 7 and FIG. 9, which show trends for a sample and an ICA component within the tail of the weld reflection, show how these effects can be successfully suppressed.

Effect of Attenuation

Some applications of guided wave-based monitoring systems are affected by strong signal attenuation, which is usually temperature dependent. This is the case, for example, of pipe inspections using the T(0,1) mode installed on pipes coated with a viscous layer such as bitumen. Typically, in the effort to compensate for this phenomenon, it would be required to compute attenuation curves (a different one for each measurement) called a "distance-amplitude correction" (DAC) curve. Each DAC curve is an exponential function of distance and can be constructed by imposing similar amplitudes for reflections from known features (such as welds). This procedure may not yield accurate result because there might be a scarcity of known features and/or every time the signal travels through a feature it loses some energy which need to be correctly considered as drops in the DAC. It is non-trivial to quantify these drops. However, the compensation processes herein described also compensate for the temperature-dependent attenuation, without the need to compute DAC curves (although, from a practical standpoint at least one DAC curve tends to be computed to calibrate the tests). This can be shown using the same dataset employed hereinbefore described, after (artificially) corrupting it in a way to simulate the effect of a temperature-dependent attenuation (since the uncoated pipe being tested was virtually unaffected by attenuation). In particular, each signal is multiplied by an exponential function of the form:

$$f(d,T)=e^{-\alpha(T)d} \quad (2)$$

where T is temperature, d is distance from the sensor, and α(T) represents a damping factor that is arbitrarily chosen, but being such that it increases linearly with increasing temperature.

FIGS. 11a to 11f illustrate the process by showing it applied to measurements 1 and 145, recorded at temperatures of 36.7 and 13.6° C. respectively. Each of the two signals is first multiplied by its attenuation curve resulting in the signals shown in FIGS. 11c and 11d, and then normalized to the end pipe reflection shown in FIGS. 11e to 11f. Substantial differences in the signal amplitude arise due to the simulated attenuation (e.g., the weld reflection at 1.5 m).

Figure 9:
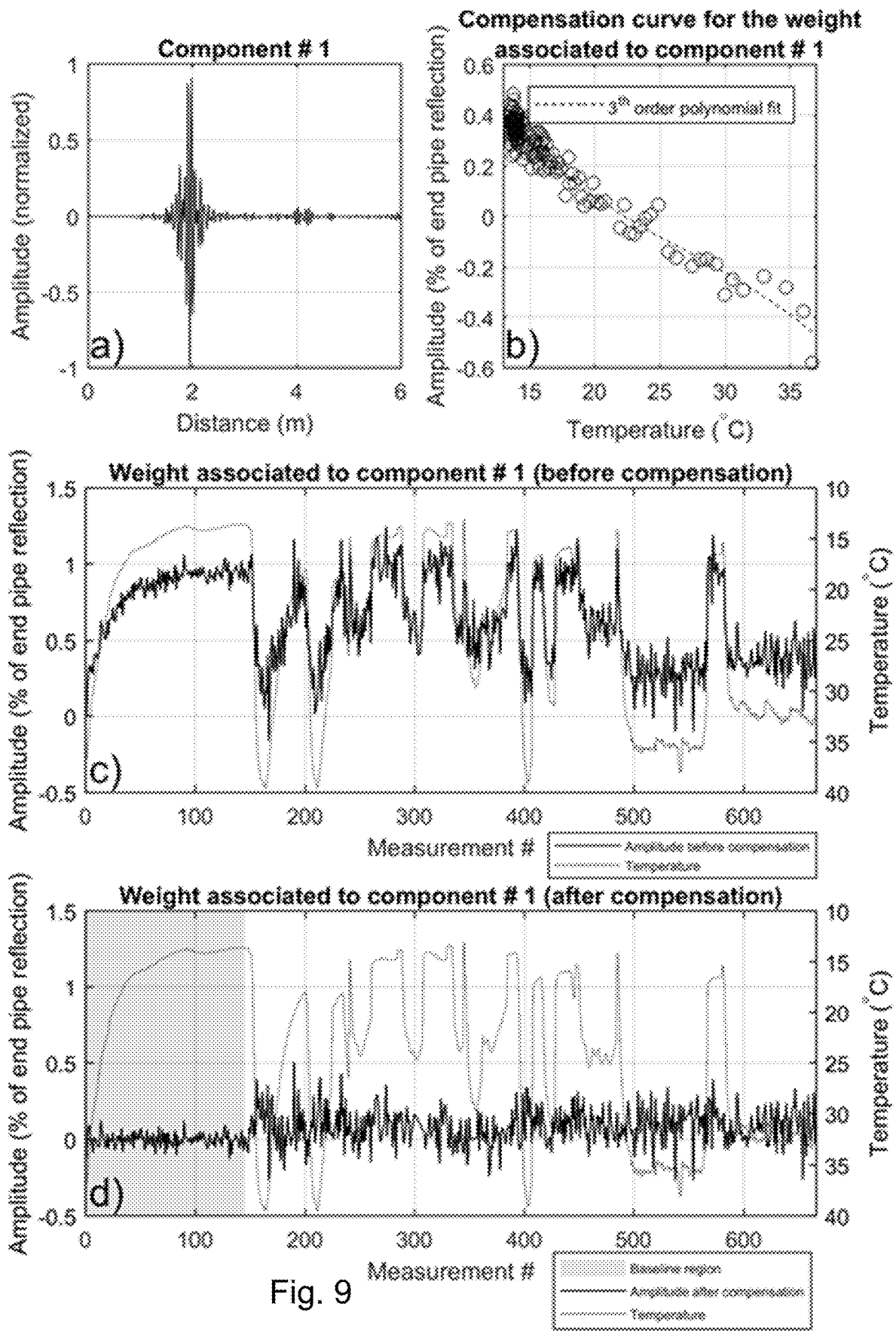
FIGS. 9a to 9d illustrate application of amplitude compensation on a weight function of a component, whose energy is in a defect-free area of the pipe, computed by using Independent Component Analysis.
Figure 10:
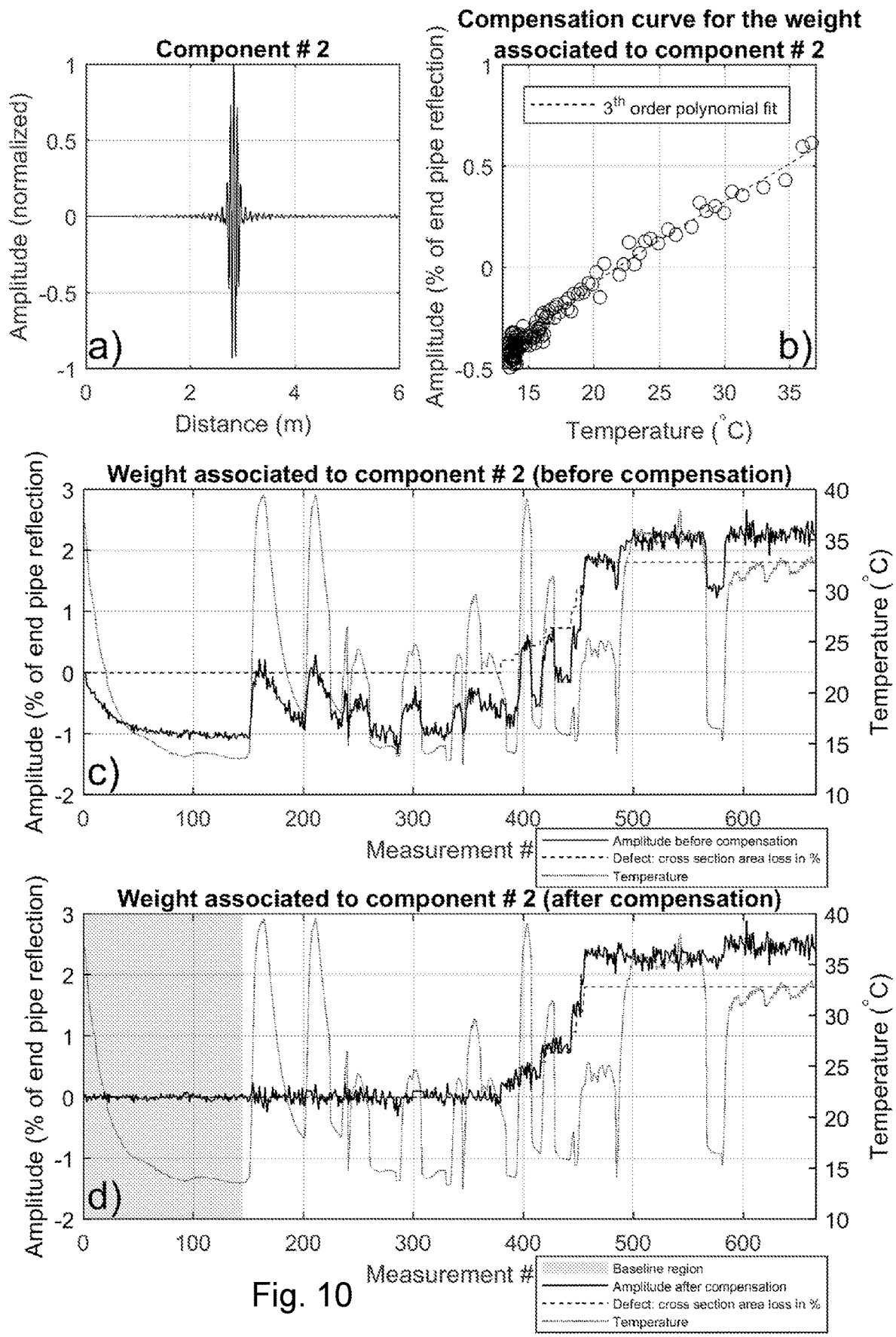
FIGS. 10a to 10d illustrate application of amplitude compensation on a weight function of a component, which is a defect signature, computed by using Independent Component Analysis.
Figure 11:
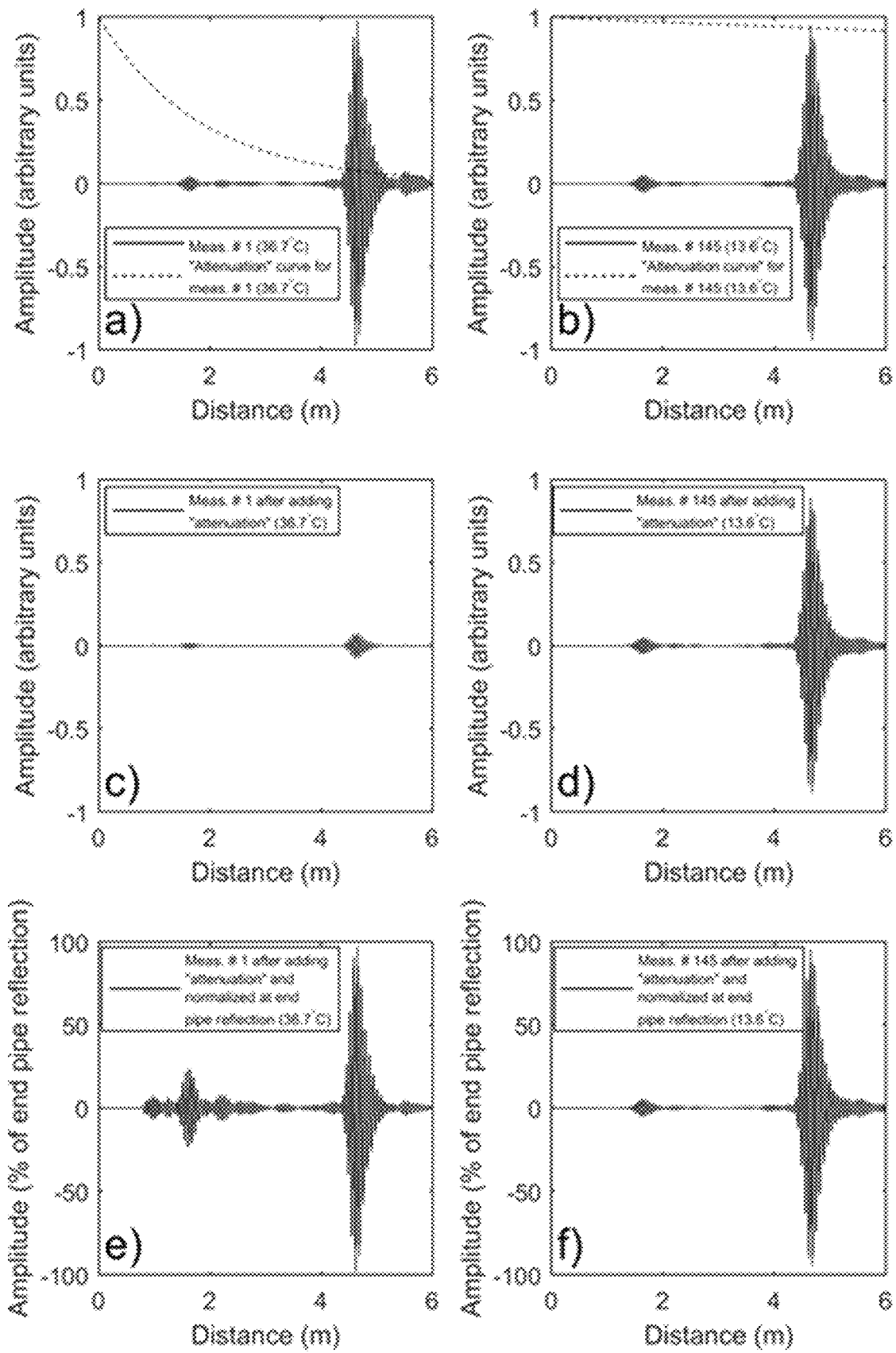
FIGS. 11a to 11f illustrate steps involved with the introduction of a simulated attenuation, wherein FIGS. 11a and 11b showing two signals and their respective attenuation curve.
Figure 12:
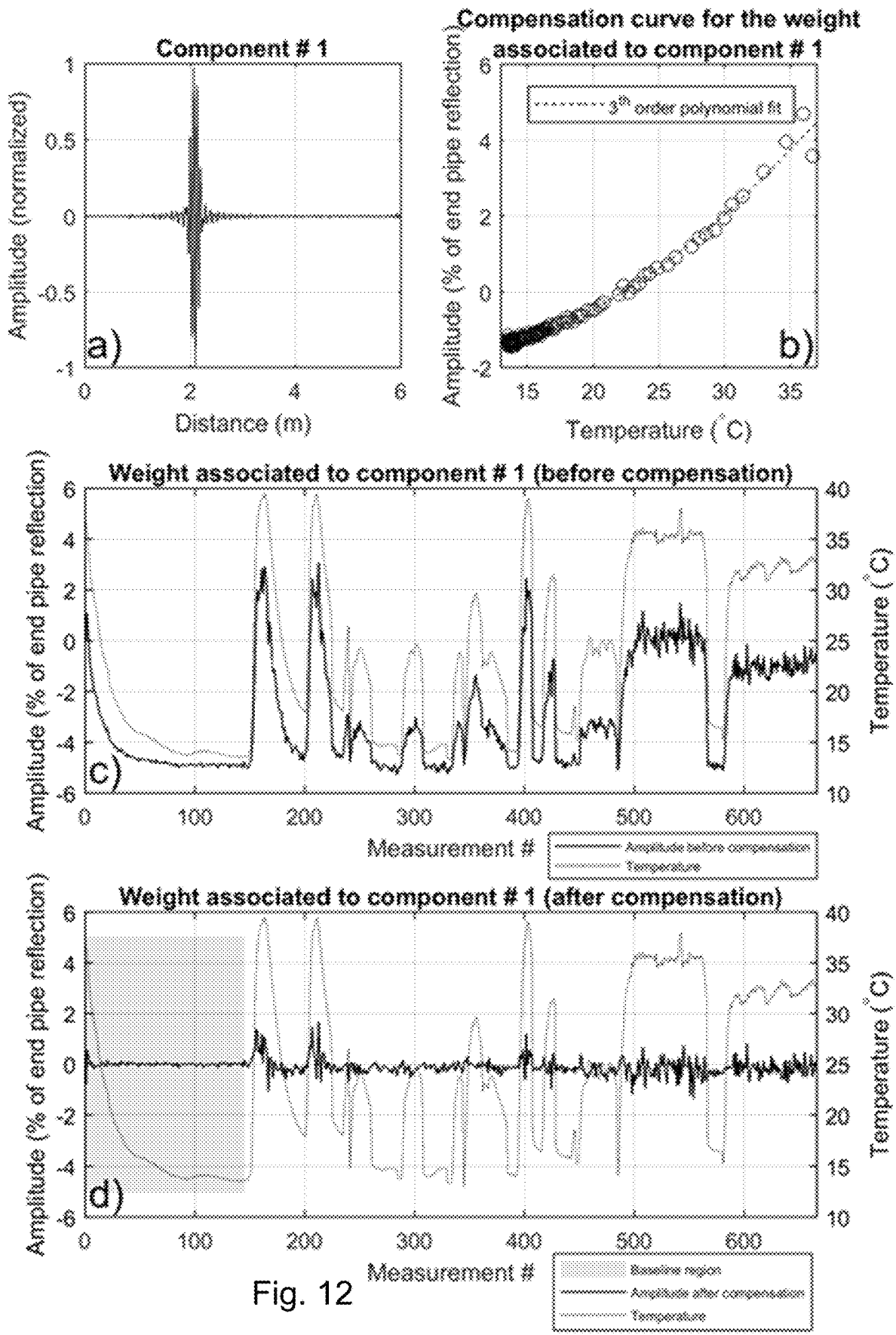
FIGS. 12a to 12d illustrate application of the amplitude compensation on the weight function of a component, whose energy is in a defect-free area of the pipe, computed by using Independent Component Analysis on the dataset corrupted by simulated attenuation.

FIG. 12 shows that the application of the compensation process to the weight function of an ICA component (resulting from an ICA being computed on the newly formed dataset) whose energy is in the proximity of the one previously considered to generate FIG. 9 successfully suppresses the amplitude variations induced by attenuation.

Compensation for Frequency Shifts Due to Signal Stretching

When dealing with measurements taken at different EOCs, the first step is usually to compensate for the temperature-dependent wave speed. A typical approach involves the computation of a stretching factor which is used to stretch or compress each signal in a way to get uniform values of wave speed across measurements taken at different temperatures. For example, the method described in J. B. Harley and J. M. F. Moura: "Scale transform signal processing for optimal ultrasonic temperature compensation" ibid. is used to obtain the signals plotted in FIG. 4.

An issue, which is particularly relevant when dealing with large ranges of temperature variations (that in turn cause rather different wave speeds), is that the stretched/compressed signal tends to exhibit lower/higher frequencies at different temperatures. This appears as fluctuations when plotting the amplitude trend over time of each sample. Since these fluctuations repeat themselves regularly at any given temperature, the compensation processes herein described can compensate for this effect as well. However, this is difficult to appreciate on a dataset such as the one hereinbefore described, where this effect is combined with the resonance effects hereinbefore described.

Accordingly, a simulated dataset is created to isolate the desired effect of frequency shift due to signal stretching. Such dataset represents an approximately 4.4 m long pipe whose only feature is the end pipe reflection being an 8-cycle toneburst at 25.5 kHz, therefore neglecting any modification due to resonance. The same temperature profile as in the actual experiment hereinbefore described is retained by imposing to the different signals wave speed values as measured at the different temperatures in the experimental dataset.

Figure 13:
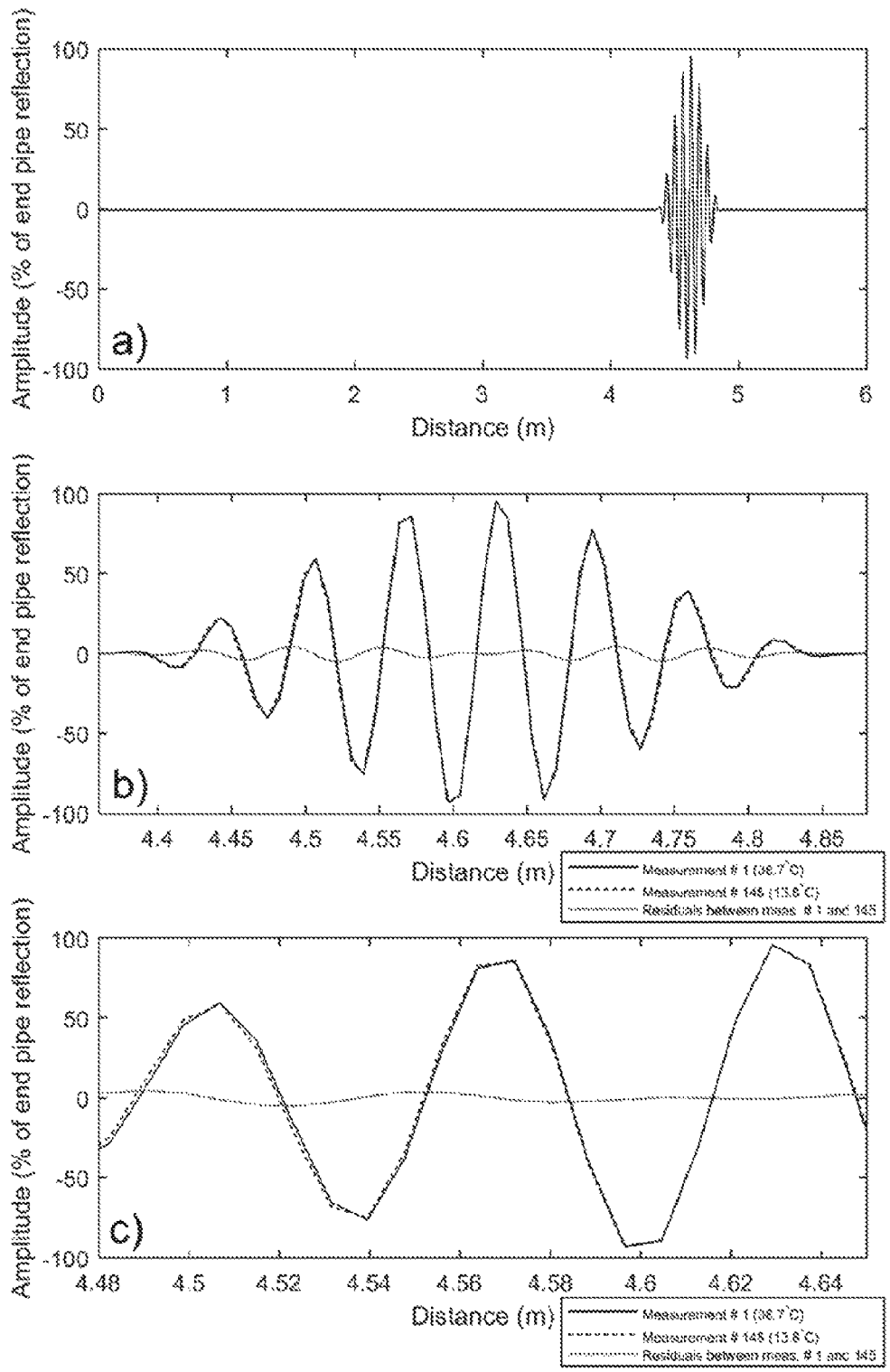
FIGS. 13a to 13c show simulated dataset including an end pipe reflection created to isolate the effect of frequency shift due to signal stretching.

FIG. 13a shows a superposition of all the simulated measurements after signal stretching, whereas FIG. 13b-c presents magnified plots of end pipe reflections from measurements 1 and 145, which clearly illustrate the frequency shift caused by signal stretching.

Figure 14:
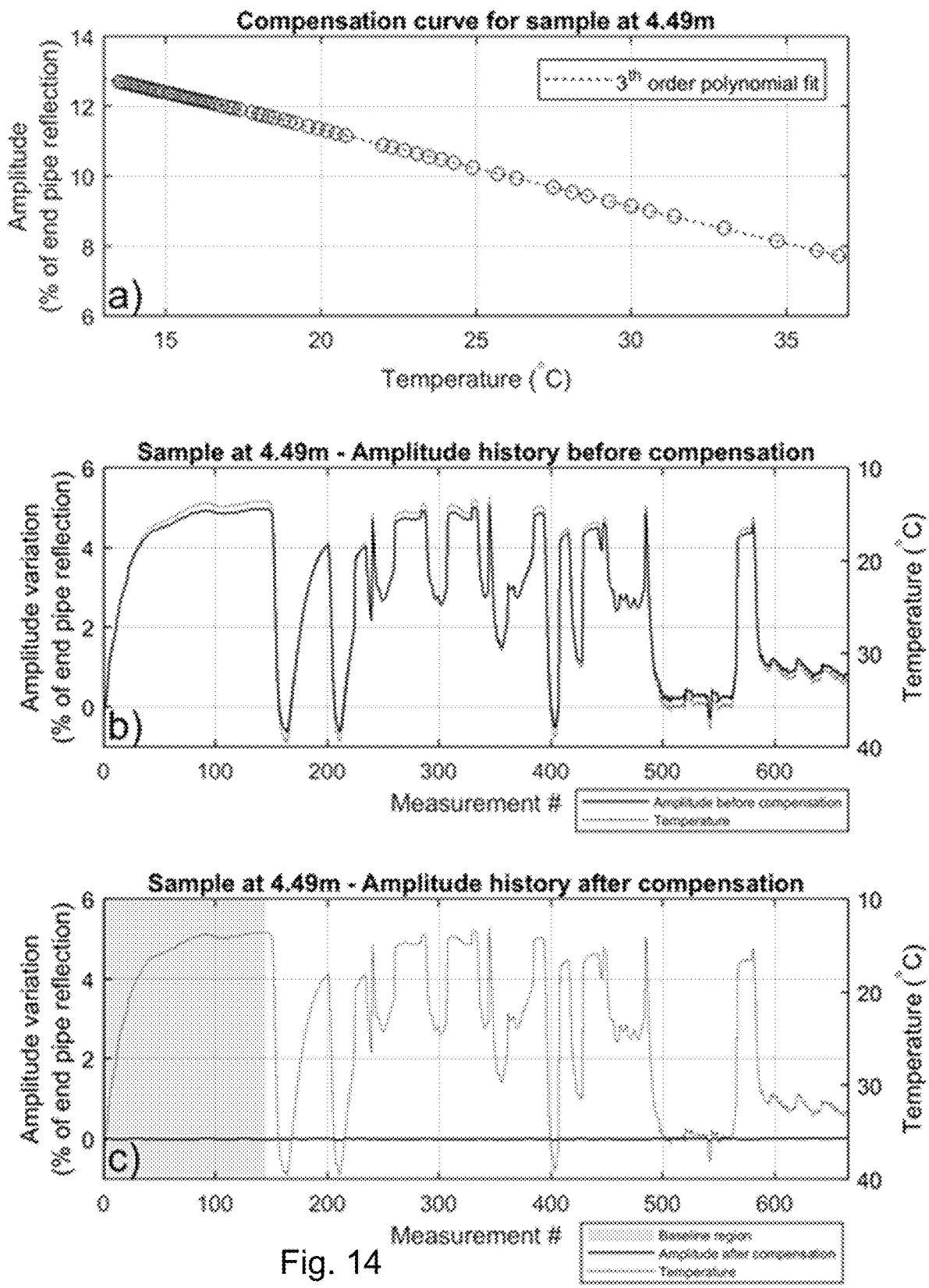
FIGS. 14a to 14c illustrate application of amplitude compensation on a sampling point in correspondence to the simulated end pipe reflection.

FIG. 14 demonstrates how the process can successfully eliminate this effect by showing the case of a sampling point at a distance of 4.49 m, which is roughly within the third cycle of the end pipe reflection. The figure shows how, before applying the amplitude compensation, the measured amplitude varies in strict agreement with the temperature profile, whereas the compensated amplitude trend is basically a flat line on the horizontal axis.

Modifications

It will be appreciated that various modifications may be made to the embodiments hereinbefore described. Such modifications may involve equivalent and other features which are already known in the design, manufacture and use of guided wave inspections systems and component parts thereof and which may be used instead of or in addition to features already described herein. Features of one embodiment may be replaced or supplemented by features of another embodiment.

In the examples hereinbefore described, processing based on changes in temperature are described. However, other environmental conditions, such as load and pipe contents, and combinations thereof may be used.

It will be appreciated that structures may be subjected to many different types of cycles of variations and that the examples of temperature variations are not limiting.

Not all the amplitude values in the signal need be processed as herein described. For example, a subset of amplitude values (or "data points") can be processed. This can help to reduce the amount of computational resources required and/or increase processing speed. The subset of data points may take the form of a sub-range of data points corresponding to a region of interest of the structure. The subset may be obtained by sampling every $n^{th}$ amplitude value (where n is a positive integer, such as 2, 3 or 4).

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method of adjusting for the effect of variations in coherent noise in a signal, the method comprising:
receiving a signal obtained from a wave of measurement of a structure under a given set of environmental and/or operational conditions, the signal comprising a set of amplitude values, wherein each amplitude value depends on a respective position in the signal; and
adjusting the amplitude value of each of at least two of the amplitude values independently using respective functions of amplitude against a set of environmental and/or operational conditions,
wherein:
each function corresponds to a respective position in the signal;
each amplitude value, of the at least two amplitude values, is adjusted by subtracting a compensation value from that amplitude value; and
the compensation value is a value predicted by the respective function for the given set of environmental and/or operational conditions, the respective function corresponding to the same position on which that amplitude value depends.

2. The method of claim 1, wherein the set of environmental conditions includes a temperature.

3. The method of claim 1, wherein the signal is a one-dimensional signal.

4. The method of claim 1, wherein the signal is a two-dimensional signal.

5. The method of claim 1, wherein the position in the signal corresponds uniquely to a position in the structure.

6. The method of claim 1, wherein adjusting each of the at least two amplitude values independently according to position in the signal comprises adjusting a majority, substantially all or all of the amplitude values in the signal.

7. The method of claim 1, wherein the signal is obtained from an elastic wave measurement of the structure.

8. The method of claim 7, wherein the elastic wave is an ultrasonic wave.

9. The method of claim 1, wherein the signal is obtained from a guided wave measurement of the structure.

10. The method of claim 1, wherein the signal is obtained from a bulk wave measurement of the structure.

11. The method of claim 1, further comprising:
pre-processing the signal before adjusting each of the at least two amplitude values.

12. The method of claim 11, wherein pre-processing the signal comprises performing time-stretch compensation.

13. The method of claim 1, comprising:
determining at least one of the environmental and/or operational conditions at which the signal is measured from the signal.

14. The method of claim 13, wherein determining the at least one of the environmental and/or operational conditions at which the signal is measured from the signal comprises:
determining the temperature at which the signal is measured from the signal.

15. The method of claim 14, further comprising:
performing a time-stretch compensation using a scaling factor; and
determining a temperature in dependence upon the scaling factor.

16. The method of claim 1, further comprising:
performing time-stretching temperature compensation; and
compensating for frequency shifts due to the time-stretching temperature compensation.

17. The method of claim 1, wherein the signal comprises a component or more than one component of a measured signal.

18. The method of claim 17, wherein the component or the more than one component is obtained by processing the measured signal using a signal decomposition method.

19. The method of claim 18, wherein the signal decomposition method comprises independent component analysis.

20. The method of claim 1, wherein the signal is obtained after performing independent component analysis.

21. A method comprising:
performing the method of claim 1 for a plurality of signals obtained at different times.

22. The method of claim 21, further comprises:
determining whether there is a change in an adjusted value over time for a given position in the signal.

23. The method of claim 21, comprising:
determining whether a change in adjusted value between first and second times exceeds a predetermined value.

24. The method of claim 21, comprising:
determining whether adjusted values for a given position changes monotonically over time; and
in dependence upon a positive determination, generating a signal for notifying a user.

25. The method of claim 1, further comprising:
prior to receiving the signal, in a calibration phase:
receiving a plurality of signals obtained from measuring wave measurement of the structure at different environmental and/or operational conditions; and
generating, for each position of a plurality of different positions, a function of amplitude against set of environmental and/or operational conditions, each function usable for adjusting an amplitude value at a given position.

26. The method of claim 1, further comprising:
causing a measurement; and
in response to causing a measurement, receiving the signal.

27. The method of claim 1, wherein the structure is a pipe.

28. The method of claim 1, wherein the structure is a plate, a bar, or a rail.

29. The method of claim 1, performed in response to receiving a measurement.

30. The method of claim 1, performed after receiving at least one measurement, in response to a trigger.

31. A computer program product comprising a non-transitory computer-readable medium storing a computer program which, when executed by at least one processor, causes the at least one processor, to perform the method of claim 1.

32. Apparatus comprising:
at least one processor; and
memory;
wherein the at least one processor is configured to perform the method of claim 1.

33. An inspection system comprising:
a sensor for measuring a structure and providing a measurement signal; and
apparatus according to claim 32 configured to receive the measurement signal and to obtain the signal from the measurement signal or to use the measurement signal as the signal.

34. The inspection system of claim 33, wherein the sensor is permanently installed on the structure.

* * * * *